US012429364B2

(12) United States Patent
Lukic et al.

(10) Patent No.: US 12,429,364 B2
(45) Date of Patent: Sep. 30, 2025

(54) DEVICE AND METHOD FOR DETERMINING A REFERENCE CURVE FOR THE ROTATIONAL POSITION OF A ROTARY COMPONENT

(71) Applicant: Hilti Aktiengesellschaft, Schaan (LI)

(72) Inventors: Sasha Lukic, Buchs (CH); Nenad Mitic, Pancevo (RS); Djordje Radivojevic, Beograd (RS)

(73) Assignee: Hilti Aktiengesellschaft, Schaan (LI)

( * ) Notice: Subject to any disclaimer, the term of this patent is extended or adjusted under 35 U.S.C. 154(b) by 194 days.

(21) Appl. No.: 18/257,229

(22) PCT Filed: Dec. 13, 2021

(86) PCT No.: PCT/EP2021/085463
§ 371 (c)(1),
(2) Date: Jun. 13, 2023

(87) PCT Pub. No.: WO2022/012890
PCT Pub. Date: Jun. 23, 2022

(65) Prior Publication Data
US 2024/0035861 A1   Feb. 1, 2024

(30) Foreign Application Priority Data

Dec. 14, 2020  (EP) ..................................... 20213663

(51) Int. Cl.
*G01D 5/347*   (2006.01)
(52) U.S. Cl.
CPC ....... *G01D 5/3473* (2013.01); *G01D 5/34707* (2013.01)
(58) Field of Classification Search
CPC ............. G01D 5/3473; G01D 5/34707; G01D 5/34715; G01D 5/34792
See application file for complete search history.

(56) References Cited

U.S. PATENT DOCUMENTS

2004/0178332 A1* 9/2004 Ahne ..................... G01D 5/366
                                                             250/231.13
2017/0227383 A1  8/2017 Tseng

FOREIGN PATENT DOCUMENTS

EP          2388556 A1 * 11/2011  ......... G01D 5/24476
KR    10 2010 0059647 A     6/2010

OTHER PUBLICATIONS

EP_2388556_A1 translation (Year: 2011).*
PCT/EP2021/085463, International Search Report dated Mar. 16, 2022 (Two (2) pages).

* cited by examiner

*Primary Examiner* — Tarifur R Chowdhury
*Assistant Examiner* — Carlos Perez-Guzman
(74) *Attorney, Agent, or Firm* — Crowell & Moring LLP (57) ABSTRACT

A device for determining a reference curve for a rotational position of a rotary component rotatable about an axis of rotation. An encoder disk is connected to the rotary component and is rotatable about the axis of rotation where the encoder disk is circular and has a periodic outer contour with periods. A beam source emits a measuring beam directed onto the periodic outer counter of the encoder disk. A control unit is connected to a sensor unit. Each of the periods of the periodic outer contour of the encoder disk are made up of a respective first function portion and a respective second function portion where the first function portion and the second function portion follow a monotonic progression and where one of the first function portion and the second function portion increases monotonically and the other of the first function portion and the second function portions decreases monotonically.

8 Claims, 6 Drawing Sheets

DEVICE AND METHOD FOR DETERMINING A REFERENCE CURVE FOR THE ROTATIONAL POSITION OF A ROTARY COMPONENT

BACKGROUND AND SUMMARY OF THE INVENTION

The present invention relates to a device for determining a reference curve for the rotational position of a rotary component and to a method for determining a reference curve for the rotational position of a rotary component by such a device.

The rotational position of a rotary component is determined using encoders. An encoder is a device which converts a position or motion value into an electrical signal, usually a digital code. Encoders can be designed as rotating or linear and be designed as absolute or incremental encoders. In contrast to absolute encoders, incremental encoders must be referenced after switching on, since positional changes (change in position or change in angle) are not recorded in the switched-off state.

The encoder comprises an encoder disk, which is connected to the rotary component and is rotatable about the axis of rotation of the rotary component, and an angle measuring device. The angle measuring device comprises a beam source, a sensor unit and a control unit. The beam source generates a measuring beam which strikes or passes through a slotted encoder disk, so that the measuring beam is allowed through or blocked. The sensor unit, which is designed as an optical detector or a reading head, detects the passing through of the measuring beam and generates a corresponding electrical signal. The sensor unit comprises two offset photodetectors. When the encoder disk rotates, the photodetectors are alternately illuminated. The measured values of the first photodetector are recorded as first measured values (first output signal) and the measured values of the second photodetector are recorded as second measured values (second output signal).

Known encoder disks are designed as circular and have a periodic outer contour with N periods and a zero point, the developed outer contour of the encoder disks representing a rectangular function. A disadvantage of the known encoder disks is that the accuracy with which the rotational position of the rotary component can be determined, depends on the number N of periods.

The object of the present invention is to develop a device which is designed for determining a reference curve for the rotational position of a rotary component and which is suitable for determining or setting the rotational position of the rotary component with great accuracy.

According to the invention, the device is characterized in that the periods of the outer contour of the encoder disk are made up of a first function portion and a second function portion, the first function portion and second function portion following a monotonic progression, one of the first and second function portions increasing monotonically and the other of the first and second function portions decreasing monotonically. The periods being composed of a monotonically increasing function portion and a monotonically decreasing function portion has the advantage over rectangular periods that the rotational position can be determined with greater accuracy. An accurate determination of the rotational position is possible in the function portions following a monotonic progression.

The transition from the first function portion to the second function portion is preferably formed continuously. A continuous transition from the first function portion to the second function portion makes it possible for the rotational position to be determined at the transitions.

Particularly preferably, the first function portion and second function portion form a sine function. The sine function consists of monotonic function portions with a continuous transition. The device comprises a first measuring area and a second measuring area, which are different from one another and which record first measured values and second measured values. Since the outer contour of the encoder disk can be represented as a sine function, the first and second measurement curves, which are determined by means of the first measuring area and second measuring area, follow a sinusoidal progression, with the first measurement curve and second measurement curve being shifted relative to one another by a phase difference. The encoder disk of the device according to the invention makes it possible to determine the rotational position of the rotary component with great accuracy.

Preferably, the sensor unit comprises a first measuring area and a second measuring area, the first measuring area being different from the second measuring area. The method according to the invention requires a first measurement curve and a second measurement curve, which are shifted relative to one another. The first and second measurement curves are determined by means of the first measuring area and second measuring area.

In a first variant, the sensor unit has a first sensor element, which comprises the first measuring area, and a second sensor element, which comprises the second measuring area. The use of a first sensor element with the first measuring area and a second sensor element with the second measuring area allows an easy differentiation between the first measured values and second measured values.

In a second variant, the sensor unit has a sensor element with a measuring region, the first measuring area and second measuring area being integrated in the measuring region. The use of a sensor element in which the first and second measuring areas are integrated in the measuring region allows the differentiation between the first and second measured values with little expenditure on equipment.

The present invention also relates to a method for determining a reference curve for the rotational position of a rotary component by means of a device as claimed in one of claims 4 to 6, with the steps that:
  the measuring beam, which is directed onto the outer contour of the rotating encoder disk and onto the sensor unit, is recorded by the first measuring area as first measured values and by the second measuring area as second measured values,
  the first measured values and second measured values are transmitted from the sensor unit to the control unit,
  the first measured values and associated first time values are shown by the control unit as the first measurement curve and the second measured values and associated second time values are shown as the second measurement curve,
  the first measurement curve and/or second measurement curve are shifted relative to one another by the control unit until there is a phase difference of 90° between a first phase-shifted measurement curve and a second phase-shifted measurement curve,
  the phase-shifted first measurement curve and phase-shifted second measurement curve are used by the control unit to determine first function values and second function values for a number of time values and the arctangent function according to the formula $$\varphi = \tan^{-1}\left(\frac{R_1}{R_2}\right)$$

is applied to the quotients of the first and second function values and the calculated angle values are shown by the control unit as a progression over time and are stored as a reference curve for the rotational position of the rotary component.

The method according to the invention can be used to determine a reference curve for the rotational position of the rotary component from which the rotational position of the rotary component can be determined or set with great accuracy. For determining the reference curve, the measuring beam of the beam source is directed onto the outer contour of the rotating encoder disk and onto the sensor unit, the first measuring area recording first measured values and the second measuring area recording second measured values. The further evaluation and determination of the reference curve takes place in the control unit of the device.

The first measured and time values are shown by the control unit as the first measurement curve and the second measured and time values are shown as the second measurement curve. The first measurement curve and second measurement curve have a sinusoidal progression and are shifted relative to one another by a phase difference. The phase difference between the first measurement curve and second measurement curve is dependent on the spatial arrangement of the first measuring area and second measuring area. The first measurement curve and second measurement curve are shifted by the control unit relative to one another until there is a phase difference of 90° between a first phase-shifted measurement curve and a second phase-shifted measurement curve.

The control unit forms the quotient of a first and second function value respectively for a number of time values and applies the arctangent function according to the formula $$\varphi = \tan^{-1}\left(\frac{R_1}{R_2}\right)$$

to the quotients. The result of the calculations are angle values that are dependent on time. These angle values are shown by the control unit as a progression over time and are stored as a reference curve for the rotational position of the rotary component. The reference curve has a progression from which the rotational position of the rotary component can be determined or set with great accuracy.

In a preferred variant, the first measured values are used as first function values and the second measured values are used as second function values. By using the first measured values as first function values and the second measured values as second function values, the computational effort when determining the reference curve for the rotational position of the rotary component is reduced.

In an alternative preferred variant, first approximate values are used as first function values and second approximate values are used as second function values, the first approximate values being determined from the first measurement curve and the second approximate values being determined from the second measurement curve. By using first approximate values as first function values and second approximate values as second function values, the accuracy with which the reference curve for the rotational position of the rotary component is determined can be increased.

Exemplary embodiments of the invention are described hereinafter with reference to the drawings. It is not necessarily intended for this to illustrate the exemplary embodiments to scale; rather, the drawing is produced in a schematic and/or slightly distorted form where this is useful for purposes of explanation. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be restricted compared to the subject matter claimed in the claims. For given dimensioning ranges, values within the stated limits should also be disclosed as limit values and should be able to be used and claimed as desired. For the sake of simplicity, the same reference signs are used hereinafter for identical or similar parts or parts having an identical or similar function.

DETAILED DESCRIPTION OF THE DRAWINGS

Figure 1A:
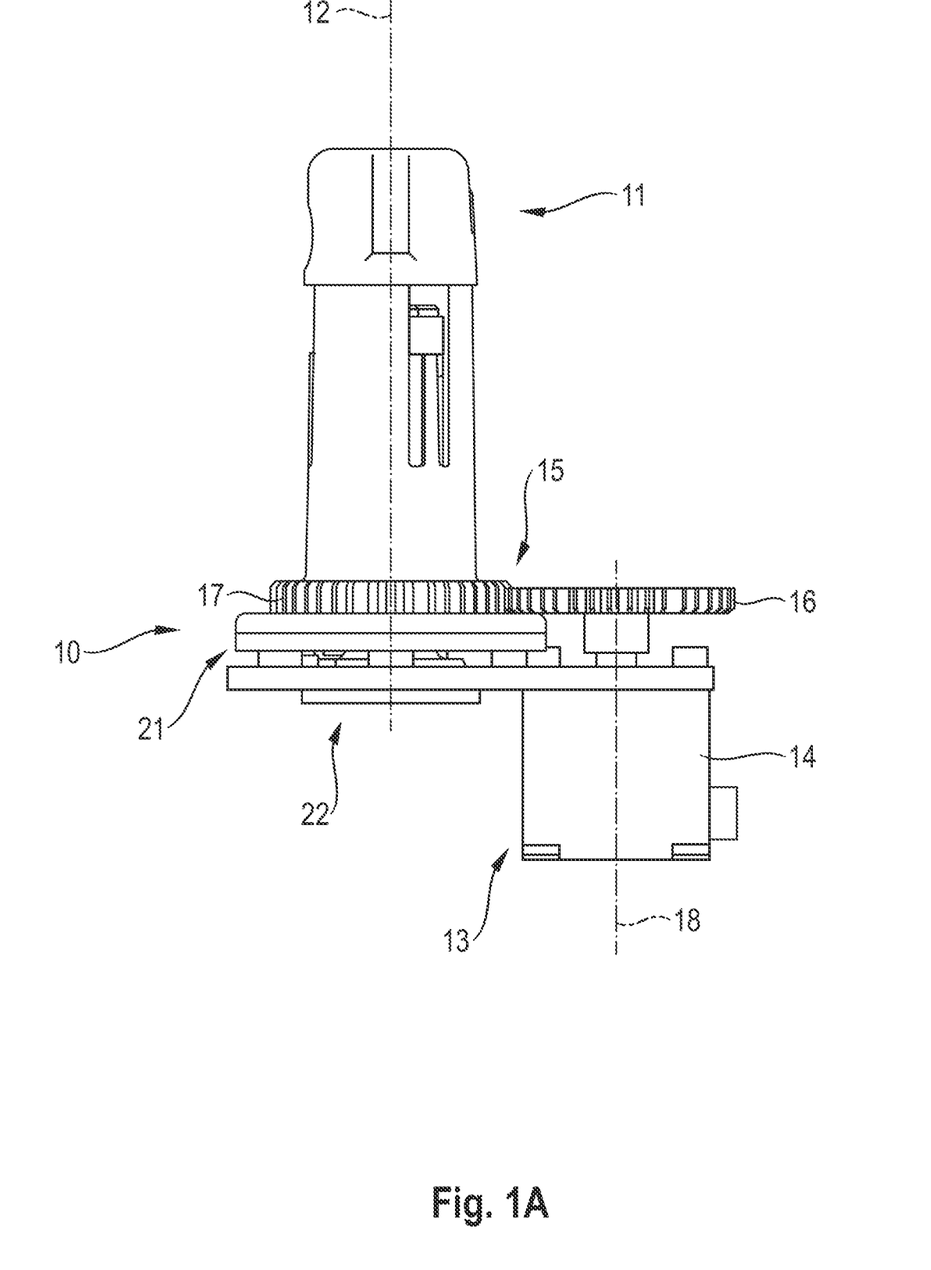
FIGS. 1A, B show a device according to the invention which is designed for determining a reference curve for the rotational position of a rotary component, in a side view (FIG. 1A) and in a longitudinal section (FIG. 1B)

FIGS. 1A, B show a device 10 according to the invention which is designed for determining a reference curve for the rotational position φ of a rotary component 11. In this case, FIG. 1A shows the device 10 in a side view and FIG. 1B in a longitudinal section.

Figure 1B:
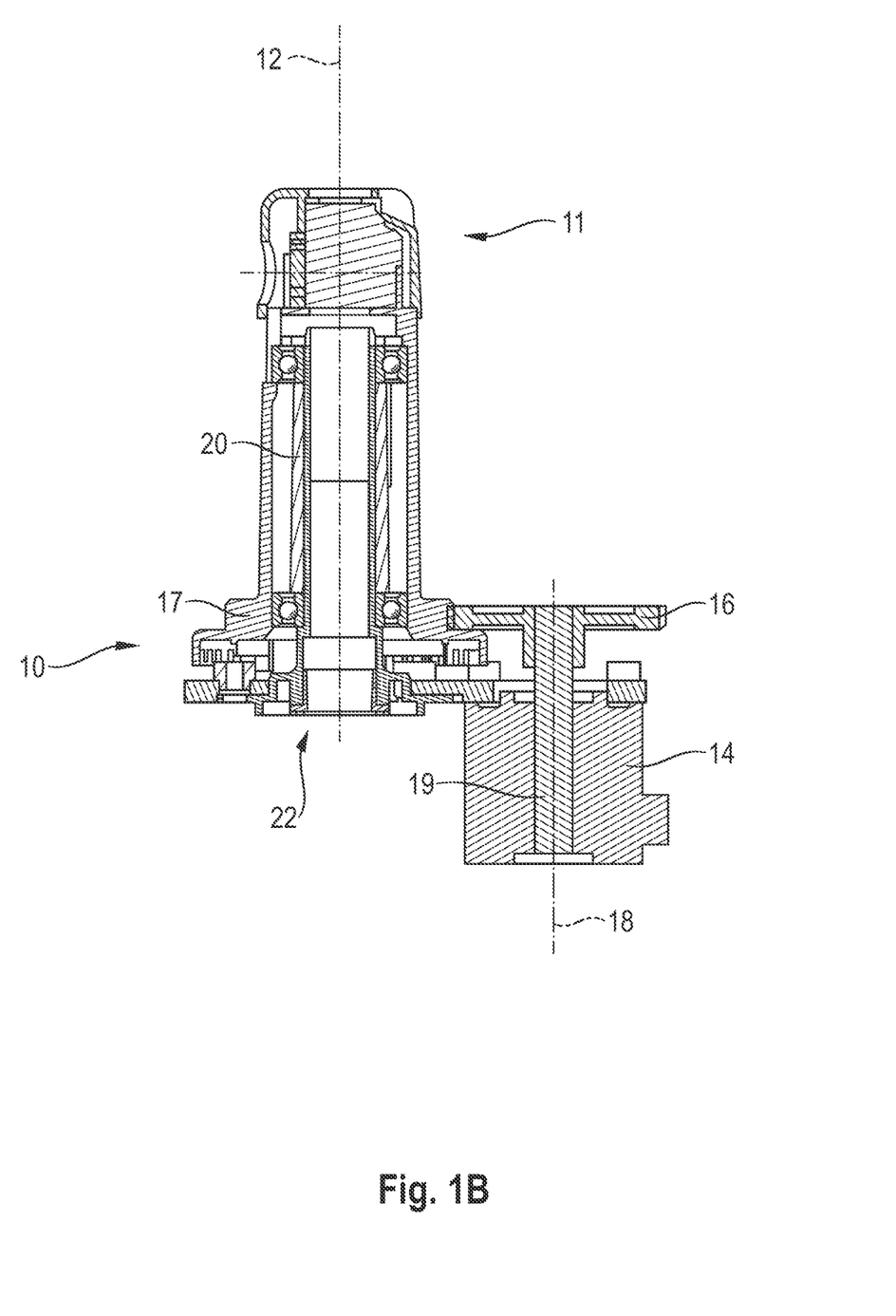

The rotary component 11 is designed as rotatable about an axis of rotation 12, the rotary component 11 being driven about the axis of rotation 12 by a drive unit 13. The drive unit 13 comprises a motor 14, which can be designed as a stepping motor, and a gear mechanism 15 with a first gear wheel 16, which is connected to the motor 14, and a second gear wheel 17, which is connected to the rotary component 11. The first gear wheel 16 meshes with the second gear wheel 17 and is driven by the motor 14 about a drive axis 18. The movement of the motor 14 is converted into a movement of the rotary component 11 about the axis of rotation 12 via the gear mechanism 15.

The motor 14 is connected to a first axle element 19, which is designed as rotatable about the drive axis 18 and is connected to the first gear wheel 16 for conjoint rotation. The rotary component 11 comprises a second axle element 20, which is connected to the second gear wheel 17 for conjoint rotation. In the exemplary embodiment, the second axle element 20 is designed as hollow on the inside and serves for guiding an optical beam, for example a laser beam.

The rotational position φ of the rotary component 11 can be measured by means of the device 10 according to the invention. The device 10 comprises an encoder disk 21 and an angle measuring device 22. The encoder disk 21 is connected to the rotary component 11 and designed as rotatable with the rotary component 11 about the axis of rotation 12.

Figure 2A:
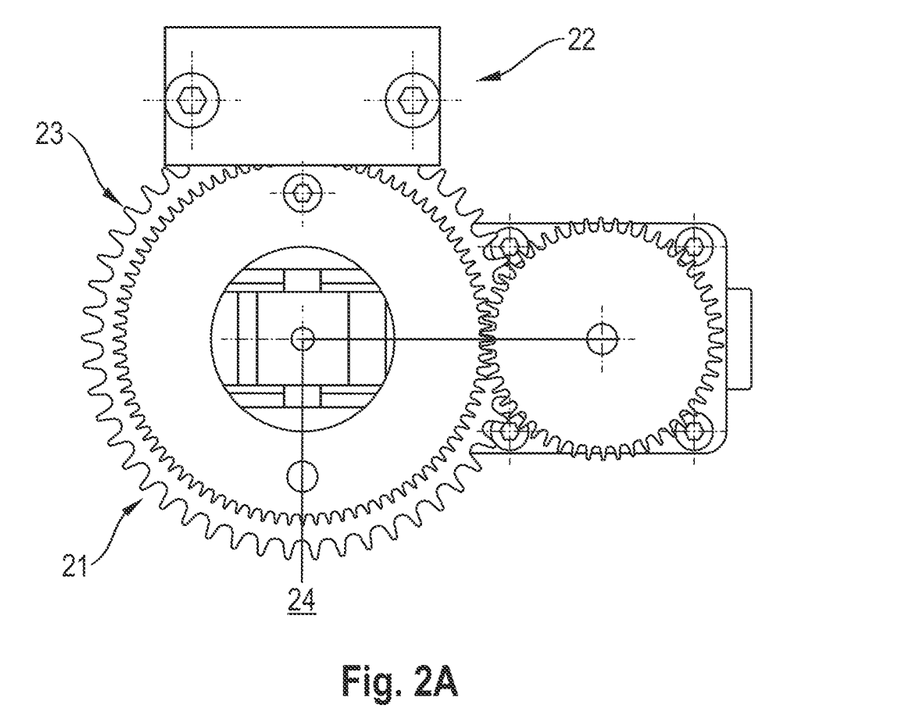
FIGS. 2A, B show the device according to the invention of FIG. 1, which comprises an encoder disk (FIG. 2A) and an angle measuring device (FIG. 2B)

FIGS. 2A, B show the encoder disk 21 and the angle measuring device 22. In this case, FIG. 2A shows the encoder disk 21 in a view from above and FIG. 2B shows the angle measuring device 22 in a schematic representation.

The rotational position φ of the rotary component 11 is determined by means of the encoder disk 21 and the angle measuring device 22. The encoder disk 21 is designed as circular and has a periodic outer contour 23, which in the embodiment of FIG. 2A is sinusoidal, with N periods and a zero point 24. The angle measuring device 22 comprises a beam source 25, which emits a measuring beam 26, a sensor unit 27 and a control unit 28, the sensor unit 27 having a first measuring area 29A and a second measuring area 29B. The first and second measuring areas 29A, 29B are connected to the control unit 28 and can transmit their measured values to the control unit 28. The measured values of the first measuring area 29A are referred to as first measured values and the measured values of the second measuring area 29B are referred to as second measured values. The sensor unit 27 of the angle measuring device 22 can be constructed in different ways.

The measuring beam 26 is aligned with the first and second measuring areas 29A, 29B. The encoder disk 21 is arranged in the beam path of the measuring beam 26 between the beam source 25 and the sensor unit 27 and can at least partially block the measuring beam 26. During the rotation of the encoder disk 21 about the axis of rotation 12, the portions of the measuring beam 26 that strike the first measuring area 29A or the second measuring area 29B vary as a result of the periodic outer contour 23 of the encoder disk 21.

Figure 2B:
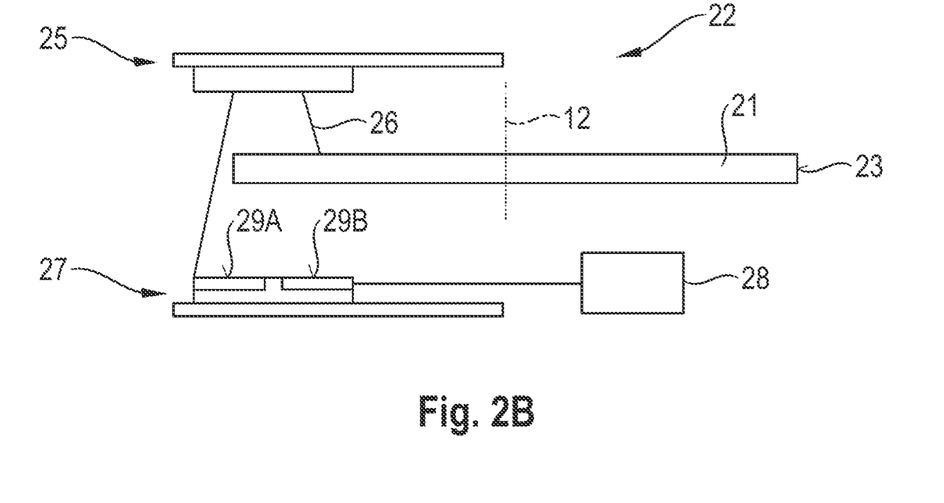

In the case of the embodiment of the angle measuring device 22 shown in FIG. 2B, the first and second measuring areas 29A, 29B are at a different distance from the axis of rotation 12. In the case of an encoder disk with a periodic outer contour that does not vary in a plane perpendicular to the axis of rotation 12, but has an outer contour attached in the form of a ring that varies parallel to the axis of rotation 12, the first and second measuring areas 29A, 29B are arranged one behind the other in the circumferential direction. Because the outer contour of the encoder disk is arranged between the beam source 25 and the sensor unit 27, the portions of the measuring beam 26 that strike the first measuring area 29A and second measuring area 29B vary.

Figure 3A:
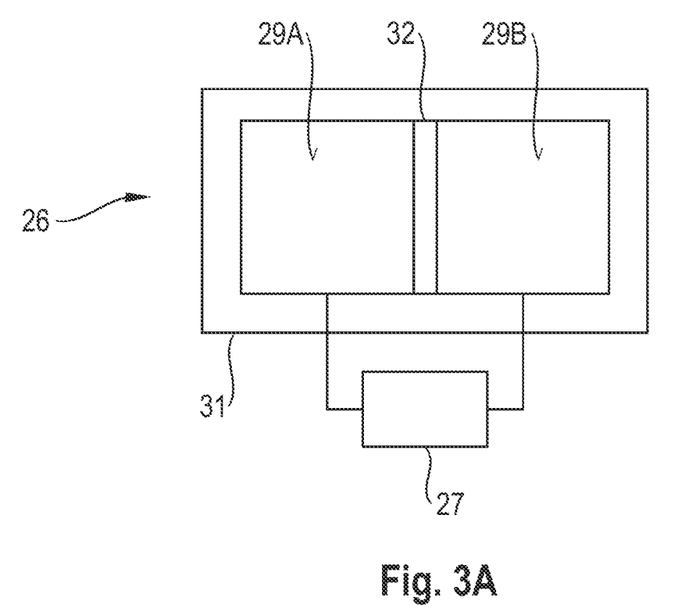
FIGS. 3A, B show a sensor unit of the angle measuring device in a first variant (FIG. 3A) and a second variant (FIG. 3B)
Figure 3B:
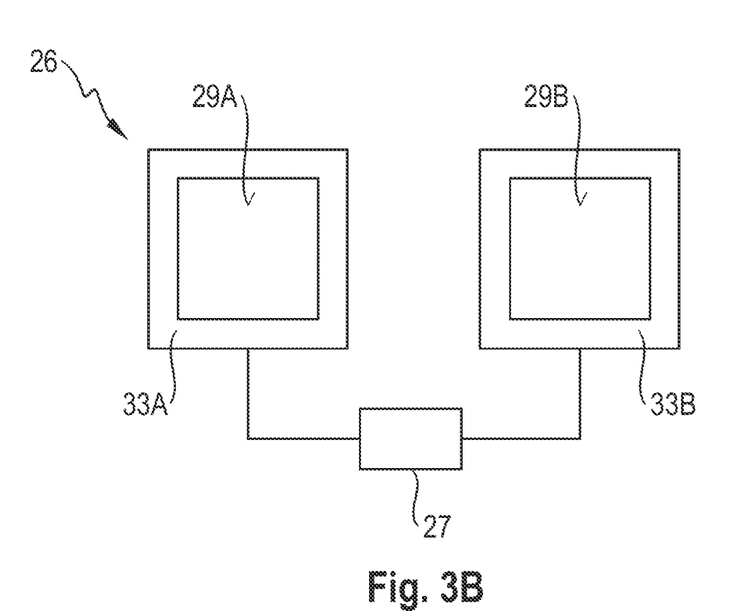

FIGS. 3A, B show the structure of the sensor unit 27 in a first variant (FIG. 3A) and in a second variant (FIG. 3B). In the first variant, the sensor unit has a sensor element 31 with a measuring region 32 and the first measuring area 29A and second measuring area 29B are integrated in the measuring region 32 of the sensor element 31. In the second variant, the sensor unit 27 has a first sensor element 33A, which comprises the first measuring area 29A, and a second sensor element 33B, which comprises the second measuring area 29B.

Figure 4A:
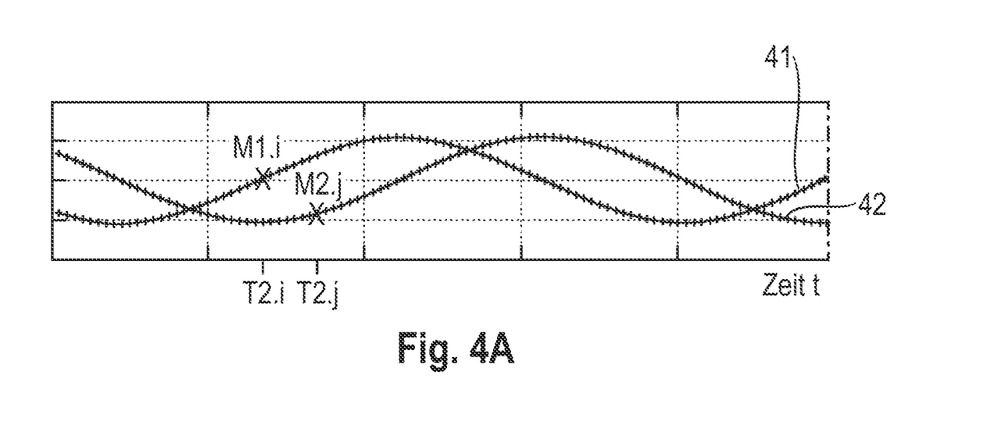
FIGS. 4A-C show various stages during the performance of the method according to the invention for determining the reference curve by means of the device of FIG. 1.
Figure 4B:
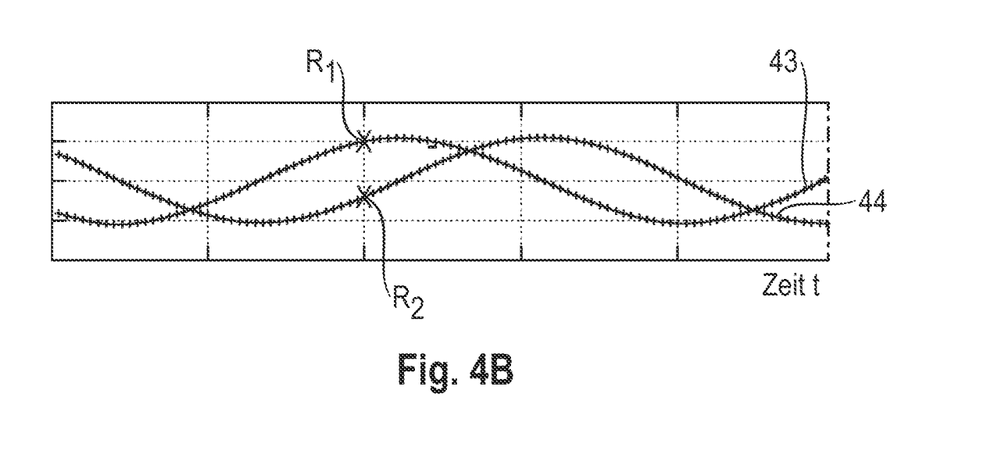
Figure 4C:
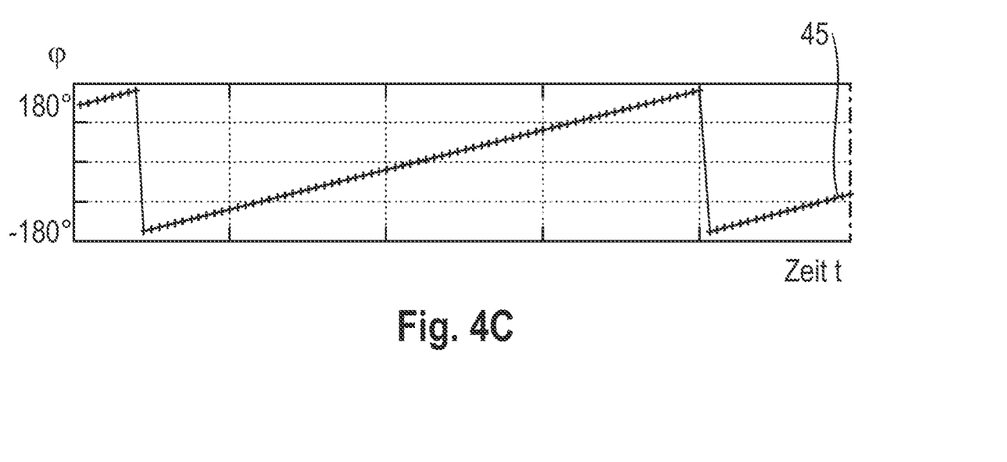

To be able to determine the rotational position φ of the rotary component 11 by means of the device 10 according to the invention, a method according to the invention for determining a reference curve for the rotational position φ of the rotary component 11 is performed. FIGS. 4A-C show different stages during the performance of the method according to the invention.

The beam source 25 emits the measuring beam 26, which is directed onto the outer contour 23 of the rotating encoder disk 21 and onto the sensor unit 27. The measuring beam 26 strikes the first measuring area 29A, which records the measuring beam 26 as first measured values $M1.i$, and the second measuring area 29B, which records the measuring beam 26 as second measured values $M2.j$. The first and second measured values $M1.i$, $M2.j$ can be recorded with a constant measuring frequency, the first and second measured values preferably being recorded with the same measuring frequency. The first measured values $M1.i$ and second measured values $M2.j$ are transmitted to the control unit 28.

For the method according to the invention, the progression over time of the first measured values $M1.i$ and second measured values $M2.j$ is required. The assignment of time values to the first and second measured values can take place in different ways. If the sensor unit 27 has a clock for measuring time, first and second time values can be assigned to the first and second measured values as soon as they are recorded. In this case, first time values $T1.i$ are assigned to the first measured values $M1.i$ and second time values $T2.j$ are assigned to the second measured values $M2.j$. The first and second time values are transmitted to the control unit 28 with the first and second measured values. If the sensor unit 27 does not have a clock for measuring time, the assignment of time values to the first and second measured values can be carried out by the control unit 28. When the first and second measured values are transmitted from the sensor unit 27 to the control unit 28, the control unit 28 creates the first time values $T1.i$ for the first measured values $M1.i$ and the second time values $T2.j$ for the second measured values $M2.j$. The time difference that passes between the recording of the measured values and the transmission to the control unit 28 is irrelevant for the accuracy with which the reference curve can be determined, since the time difference occurs with respect to the first and second measured values and the first and second measured values are used at the same points in time.

The first measured values $M1.i$ and first time values $T1.i$ are shown by the control unit 28 as the first measurement curve 41 and the second measured values $M2.j$ and second time values $T2.j$ are shown as the second measurement curve 42. Since the outer contour 23 of the encoder disk 21 can be represented as a sine function, the first measurement curve 41 and second measurement curve 42 follow a sinusoidal progression, the first measurement curve 41 and second measurement curve 42 being shifted relative to one another by a phase difference. The phase difference between the first measurement curve 41 and second measurement curve 42 is dependent on the spatial arrangement of the first measuring area 29A and second measuring area 29B; the exact phase difference is not required for the method according to the invention.

The first measurement curve 41 and second measurement curve 42 are shifted by the control unit 28 relative to one another until there is a phase difference of 90° between a phase-shifted first measurement curve 43 and a phase-shifted second measurement curve 44. A phase difference of 90° can easily be determined by the sinusoidal progression of the first and second measurement curves 41, 42. For example, there is a phase difference of 90° when the first maximum of the first measurement curve 41 coincides with the first zero point of the second measurement curve 42. The phase difference of 90° can be produced by shifting the first measurement curve 41, by shifting the second measurement curve 42 or by shifting the first and second measurement curves 41, 42.

A reference curve 45 for the rotational position φ of the rotary component 11 is determined by means of the phase-shifted first and second measurement curves 43, 44. Two different variants are possible in this case. In a first variant, the reference curve 45 is determined by means of the first and second measured values, and in a second variant the reference curve is determined by means of the first and second approximate values.

The first variant uses the first measured values M1.i, which were measured by the first measuring area 29A, and the second measured values M2.j, which were measured by the second measuring area 29B. As a result of the shifting of the first and/or second measurement curve 41, 42, a shifting of the first and/or second time values T1.i, T2.j is necessary. The first time values T1.i have to be adapted to the phase-shifted first measurement curve 43 and/or the second time values T2.j have to be adapted to the phase-shifted second measurement curve 44. After the adaptation of the first and/or second time values, there is a table of values with first measured values, second measured values and associated time values. The control unit 28 forms the quotient of the first measured value and second measured value respectively for a number of time values and applies the arctangent function according to the formula $$\varphi = \tan^{-1}\left(\frac{R_1}{R_2}\right)$$

to the quotients. The result of the calculations are angle values that are dependent on time. The angle values are shown by the control unit 28 as a progression over time (FIG. 4C) and are stored as a reference curve 45 for the rotational position φ of the rotary component 11.

The second variant uses approximate values instead of the first and second measured values. The phase-shifted first measurement curve 43 and phase-shifted second measurement curve 44 have a phase difference of 90°. The control unit 28 determines first approximate values from the phase-shifted first measurement curve 43 and second approximate values from the phase-shifted second measurement curve 44 for a number of time values. After the determination, there is a table of values with first approximate values, second approximate values and associated time values. The control unit 28 forms the quotient of the first approximate value and second approximate value respectively for a number of time values and applies the arctangent function according to the formula $$\varphi = \tan^{-1}\left(\frac{R_1}{R_2}\right)$$

to the quotients. The result of the calculations are angle values that are dependent on time. The angle values are shown by the control unit 28 as a progression over time (FIG. 4C) and are stored as a reference curve 45 for the rotational position φ of the rotary component 11.

Figure 5A:
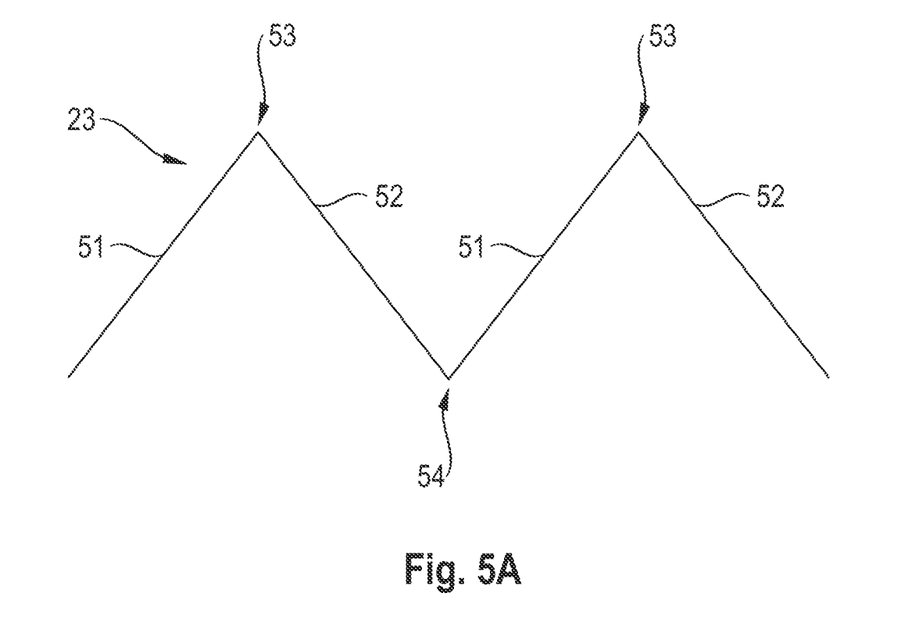
FIGS. 5A, B show the outer contour of the encoder disk in a first variant (FIG. 5A) and a second variant (FIG. 5B).
Figure 5B:
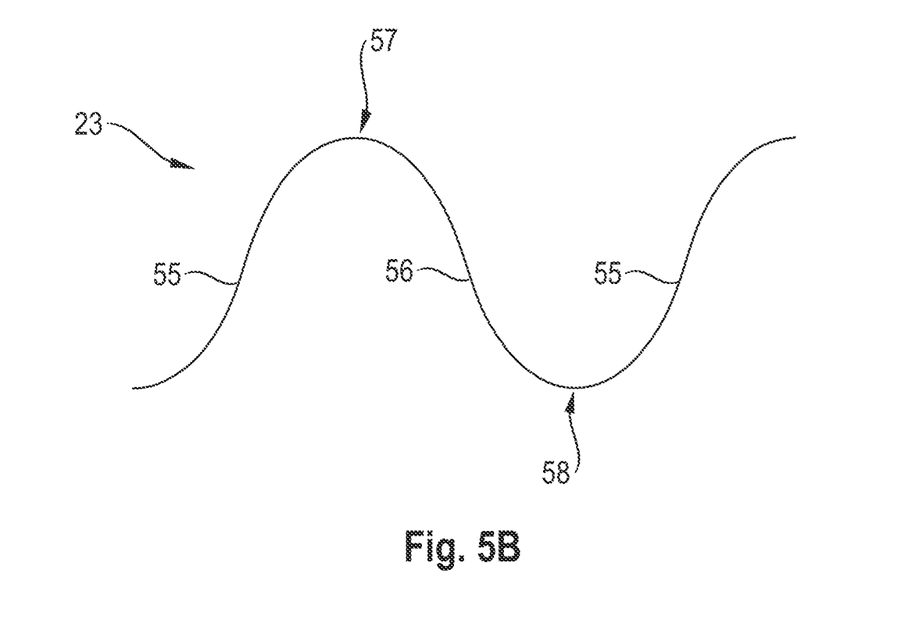

FIGS. 5A, B show the outer contour 23 of the encoder disk 21 in a first variant (FIG. 5A) and a second variant (FIG. 5B). The first variant shows a sawtooth-shaped outer contour 23 and the second variant shows a sinusoidal outer contour 23.

FIG. 5A shows the first variant of the outer contour 23, in which the periods are made up of a first function portion 51 and a second function portion 52. In this case, the first function portion 51 is designed as monotonically increasing and the second function portion 52 as monotonically decreasing. A transition 53 from the first function portion 51 to the second function portion 52 is formed discontinuously and a transition 54 from the second function portion 52 to the first function portion 51 is formed discontinuously.

The periods being composed of the monotonically increasing first function portion 51 and the monotonically decreasing second function portion 52 has the advantage over rectangular periods in that the rotational position can be determined with greater accuracy. An accurate determination of the rotational position is possible in the function portions 51, 52 following a monotonic progression.

FIG. 5B shows the second variant of the outer contour 23, in which the periods are made up of a first function portion 55 and a second function portion 56. In this case, the first function portion 55 is designed as monotonically increasing and the second function portion 56 as monotonically decreasing. A transition 57 from the first function portion 55 to the second function portion 56 is formed continuously and a transition 58 from the second function portion 56 to the first function portion 55 is formed continuously.

The periods being composed of the monotonically increasing first function portion 55 and the monotonically decreasing second function portion 56 has the advantage over rectangular periods in that the rotational position can be determined with greater accuracy. An accurate determination of the rotational position is possible in the function portions 55, 56 following a monotonic progression. As a result of the continuous transitions 57, 58 between the first function portion 55 and the second function portion 56, it is also possible to determine the rotational position at the transitions 57, 58.

The invention claimed is:

1. A device (10) for determining a reference curve (45) for a rotational position (φ) of a rotary component (11), which is rotatable about an axis of rotation (12), comprising:
   an encoder disk (21) which is connected to the rotary component (11) and is rotatable about the axis of rotation (12), wherein the encoder disk (21) is circular and has a periodic outer contour (23) with N periods and a zero point (24);
   a sensor unit (27), wherein the sensor unit (27) comprises a first measuring area (29A) and a second measuring area (29B) and wherein the first measuring area (29A) is different from the second measuring area (29B);
   a beam source (25) which emits a measuring beam (26), wherein the measuring beam (26) is directed onto the periodic outer counter (23) of the encoder disk (21) and onto the sensor unit; and
   a control unit (28) which is connected to the sensor unit (27);
   wherein each of the periods of the periodic outer contour (23) of the encoder disk (21) are made up of a respective first function portion (51, 55) and a respective second function portion (52, 56), wherein the first function portion (51, 55) and the second function portion (52, 56) follow a monotonic progression, and wherein one of the first function portion and the second function portion increases monotonically and the other of the first function portion and the second function portions decreases monotonically;

wherein the first measuring area (29A) and the second measuring area (29B) are configured to record the measuring beam (26), which is directed onto the periodic outer contour (23) of the encoder disk (21) and onto the sensor unit (27), as first measured values (M1.*i*) and as second measured values (M1.*i*), respectively;

wherein the sensor unit (27) is configured to transmit the first measured values (M1.*i*) and the second measured values (M2.*j*) to the control unit (28);

wherein the control unit (28) is configured to:
- show the first measured values (M1.*i*) and associated first time values (T1.*i*) as a first measurement curve (41) and show the second measured values (M2.*j*) and associated second time values (T2.*j*) as a second measurement curve (42);
- shift the first measurement curve (41) and the second measurement curve (42) relative to one another until there is a phase difference of 90° between a phase-shifted first measurement curve (43) and a phase-shifted second measurement curve (44);
- use the phase-shifted first measurement curve (43) and the phase-shifted second measurement curve (44) to determine first function values ($R_1$) for a number of first time values ($T_1$) and second function values ($R_2$) for a number of second time values ($T_2$) and apply an arctangent function according to the formula $$\varphi = \tan^{-1}\left(\frac{R_1}{R_2}\right)$$

to quotients of the first function values ($R_1$) and the second function values ($R_2$); and
- show calculated function values as a progression over time and store the calculated function values as the reference curve (45) for the rotational position (@) of the rotary component (11).

2. The device as claimed in claim 1, wherein a transition (53, 57) from the first function portion (51, 55) to the second function portion (52, 56) is formed continuously and/or a transition (54, 58) from the second function portion (52, 56) to the first function portion (51, 55) is formed continuously.

3. The device as claimed in claim 2, wherein the first function portion (52) and the second function portion (52) form a sine function.

4. The device as claimed in claim 1, wherein the sensor unit (27) has a first sensor element (33A) which comprises the first measuring area (29A) and a second sensor element (33B) which comprises the second measuring area (29B).

5. The device as claimed in claim 1, wherein the sensor unit (27) has a sensor element (31) with a measuring region (32) and wherein the first measuring area (29A) and the second measuring area (29B) are integrated in the measuring region (32).

6. A method for determining a reference curve (45) for a rotational position (φ) of a rotary component (11), which is rotatable about an axis of rotation (12), by a device (10), wherein the device (10) comprises:
- an encoder disk (21) which is connected to the rotary component (11) and is rotatable about the axis of rotation (12), wherein the encoder disk (21) is circular and has a periodic outer contour (23) with N periods and a zero point (24);
- a beam source (25) which emits a measuring beam (26), wherein the measuring beam (26) is directed onto the periodic outer counter (23) of the encoder disk (21);
- a sensor unit (27), wherein the sensor unit (27) comprises a first measuring area (29A) and a second measuring area (29B) and wherein the first measuring area (29A) is different from the second measuring area (29B); and
- a control unit (28) which is connected to the sensor unit (27);

wherein each of the periods of the periodic outer contour (23) of the encoder disk (21) are made up of a respective first function portion (51, 55) and a respective second function portion (52, 56), wherein the first function portion (51, 55) and the second function portion (52, 56) follow a monotonic progression, and wherein one of the first function portion and the second function portion increases monotonically and the other of the first function portion and the second function portions decreases monotonically;

the method comprising the steps of:
- recording the measuring beam (26), which is directed onto the periodic outer contour (23) of the rotating encoder disk (21) and onto the sensor unit (27), by the first measuring area (29A) as first measured values (M1.*i*) and by the second measuring area (29B) as second measured values (M1.*j*);
- transmitting the first measured values (M1.*i*) and the second measured values (M2.*j*) from the sensor unit (27) to the control unit (28);
- showing the first measured values (M1.*i*) and associated first time values (T1.*i*) by the control unit (28) as a first measurement curve (41) and showing the second measured values (M2.*j*) and associated second time values (T2.*j*) as a second measurement curve (42);
- shifting the first measurement curve (41) and the second measurement curve (42) relative to one another by the control unit (28) until there is a phase difference of 90° between a phase-shifted first measurement curve (43) and a phase-shifted second measurement curve (44);
- using the phase-shifted first measurement curve (43) and the phase-shifted second measurement curve (44) by the control unit (28) to determine first function values ($R_1$) for a number of first time values ($T_1$) and second function values ($R_2$) for a number of second time values ($T_2$) and applying an arctangent function according to the formula $\varphi = \tan^{-1}(R_1/R_2)$ to quotients of the first function values ($R_1$) and the second function values ($R_2$); and
- showing calculated function values by the control unit (28) as a progression over time and storing the calculated function values as the reference curve (45) for the rotational position (@) of the rotary component (11).

7. The method as claimed in claim 6, wherein the first measured values (M1.*i*) are used as the first function values ($R_1$) and the second measured values (M2.*j*) are used as the second function values ($R_2$).

8. The method as claimed in claim 6, wherein first approximate values are used as the first function values ($R_1$) and second approximate values are used as the second function values ($R_2$) and wherein the first approximate values are determined from the phase-shifted first measurement curve (43) and the second approximate values are determined from the phase-shifted second measurement curve (44).

\* \* \* \* \*